J. HAGEMEISTER.
APPARATUS FOR HEATING LARGE BODIES OF AIR.
APPLICATION FILED NOV. 30, 1910.
1,010,898.
Patented Dec. 5, 1911.
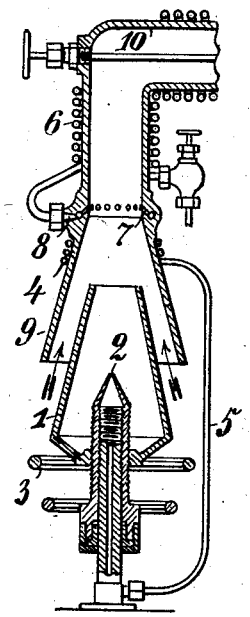
Witnesses
J. P. Davis
Inventor
Jan Hagemeister
BY
ATTORNEYS

UNITED STATES PATENT OFFICE.

JAN HAGEMEISTER, OF VORDINGBORG, DENMARK.

APPARATUS FOR HEATING LARGE BODIES OF AIR.

1,010,898.  Specification of Letters Patent.  Patented Dec. 5, 1911.

Application filed November 30, 1910. Serial No. 594,926.

*To all whom it may concern:*

Be it known that I, JAN HAGEMEISTER, citizen of the Kingdom of Denmark, and a resident of Østervej 5, Vordingborg, Denmark, machinery apprentice, have invented new and useful Improvements in and Apparatus for Heating Large Bodies of Air, so as to Obtain Large Pressure, of which the following is a specification.

My invention concerns an apparatus for the heating of large bodies of air, for the purpose of obtaining large pressure, and transmitting said pressure into effective work.

The invention can be made use of in all such places where it is of importance to heat large bodies of air and transmit them at high speed or subject them to large pressure.

The invention consists in the construction and arrangement of parts as hereinafter fully described and pointed out in the claims.

The invention is shown in one form of execution on the accompanying drawing, which shows a longitudinal section through the apparatus, but it should be remarked that of course the apparatus can be varied in many ways, without deviating from the principle underlying the invention.

2 is the burner to which the combustible material is conducted through a tube 5, which can form a spiral 4 over the burner, whereby the outflowing heat can heat the combustible material, and transmit it in the form of steam. By suitable means, not shown upon the drawing and which do not form a part of my invention, the combustible material is subjected to large pressure, in such a way that the outflowing steam from the point of the burner 2, when it is lighted, ascends rapidly. Around the point of the burner is fixed a funnel shaped screen 1, which can be adjusted in a perpendicular direction for instance by turning the hand wheel 3. Over the funnel 1 there is another funnel 9, concentric with the funnel 1, in such a way that a conical ring shaped channel is formed through which a powerful body of air is sucked in by the flame from the burner 2. The funnel 9 ends above in the channel 10, which conveys the flame and the superheated air hence where it is to be employed.

Around the channel 10 there is a coil tube 6 ending in the channel 8, which lies like a ring around the upper part of the funnel 9. From the channel 8 a number of mouth pieces 7 which point upward lead into the interior of the tube. When the tube 10 is warmed by the passage of the heated bodies of air, the warmth will spread to the coil tube 6, which thereby will cause the circulating water to assume the form of steam, the steam will flow out through the outlets 7 and mix with the passing air. Through the channel 10 there will thus flow a superheated mixture of products of the combustion atmospheric air and steam, and on account of the speed a powerful pressure will be exerted on the walls of the channel which pressure in one suitable manner or another can be transmitted to effective work, for instance the channel can debouch in a container where the heated gases can be gathered.

What I claim, and desire to secure by Letters Patent, is:

1. An apparatus of the character described, comprising a burner, a conical shell surrounding the burner, a conduit having a conical end extending over the upper end of the shell and forming therewith an annular air passage open at its lower end, means for supplying a hydrocarbon to the burner, and a water circulating coil surrounding the conduit and communicating therewith above the shell through a plurality of small openings.

2. An apparatus of the character described, comprising a burner, a conical shell surrounding the burner, a second conical shell extending over the upper end of the first shell and forming therewith an annular air passage, a conduit leading from the second shell, a coil for a hydrocarbon, surrounding the second shell and connected with the burner, and a water circulating coil surrounding the conduit and communicating with the conduit through a plurality of small openings.

3. An apparatus of the character described, comprising a burner, an adjustable conical shell surrounding the burner, a second conical shell extending over the upper end of the first shell and forming therewith an annular air passage, a conduit leading from the second shell, an annular passage at the junction of the shell and conduit and from which a plurality of openings lead into the conduit, a water circulating coil surrounding the conduit and connected with the said passage, and a coil for hydrocarbon surrounding the second shell and connected with the burner.

Signed by me at Copenhagen, Denmark November 1910.

JAN HAGEMEISTER.

Witnesses:
CHARLES HUDE,
O. W. OLSING.

Copies of this patent may be obtained for five cents each, by addressing the "Commissioner of Patents, Washington, D. C."